United States Patent [19]
Guralnick et al.

[11] Patent Number: 6,058,192
[45] Date of Patent: May 2, 2000

[54] UNIVERSAL SIGNAL PROCESSOR AND METHOD OF PROCESSING

[75] Inventors: Brian Guralnick, Dollard Des Ormeaux, Canada; Greg Paterno, Scottsdale, Ariz.

[73] Assignee: Greg Jarque, Holbrook, N.Y.

[21] Appl. No.: 08/689,318

[22] Filed: Aug. 6, 1996

[51] Int. Cl.[7] .............................. H04N 7/171; H04N 5/44
[52] U.S. Cl. ........................................... 380/240; 348/571
[58] Field of Search .................................. 380/15, 17, 19, 380/10, 240; 348/51, 571

[56] References Cited

U.S. PATENT DOCUMENTS

| | | | |
|---|---|---|---|
| 4,630,113 | 12/1986 | Long | 380/19 |
| 5,113,440 | 5/1992 | Harney et al. | 380/15 |
| 5,305,382 | 4/1994 | Hayashi et al. | 380/10 X |

*Primary Examiner*—Gilberto Barron, Jr.
*Attorney, Agent, or Firm*—Collard & Roe, P.C.

[57] ABSTRACT

A method for decoding and reconstructing a scrambled video signal is provided in which a scrambled video signal is received and the location of at least one predetermined element of the scrambled video signal is determined. Next, a horizontal sync is generated at the proper location of an output signal in response to the location of the at least one predetermined element of the scrambled video signal. Finally, the remainder of the scrambled video signal is output as an unscrambled video signal. A method of encoding a video signal is also provided, which comprises the steps of receiving an unscrambled video signal and producing a scrambled video signal by altering at least one predetermined element of the unscrambled video signal without providing encoding data to aid in the decoding of the scrambled video signal. An apparatus for decoding and reconstructing a scrambled video signal is also provided, which comprises a tuner for receiving and tuning a scrambled video signal and a transition tester coupled with the tuner for testing the scrambled video signal to determine the location of at least one predetermined element of the video signal. A video processor receiving an indication substantially corresponding to the determination of the at least one predetermined element from the transition tester is also provided. The video processor generates and outputs a horizontal sync in response to the indication from the transition tester. A selector coupled with the video processor outputs the remainder of the scrambled video signal as an unscrambled video signal.

3 Claims, 5 Drawing Sheets

UNIVERSAL SIGNAL PROCESSOR AND METHOD OF PROCESSING

BACKGROUND OF THE INVENTION

This invention relates generally to a universal signal processor, decoder and encoder and more particularly to a universal signal processor, encoder and decoder for processing video and audio signals sent and/or received over a cable television wire, or other medium.

Today, most of the marketplace receives their television video and audio signals over a cable communications system, or other similar method of transmission of video and audio data. In order to preserve the integrity of the data and to ensure that the signal is not received and viewed by individuals who are not customers of the particular cable system or have not paid for service, the service providers scramble the signals. Generally, the signals are scrambled in either one of two ways.

First, the electrical wave signal for the audio and video may be inverted. Second, the horizontal sync wave form may have a gain placed upon it, thereby not allowing an individual who is not authorized to receive the signal to read and decode the signal properly. While essentially only these two methods are employed, any number of methods, or a combination thereof may be employed. Therefore, in order to decode a particular encryption scheme, it is necessary for a customer of a cable system to employ a signal decoder (i.e. cable box or converter), or other device, which is specifically designed to decode a particular decoding scheme.

Each cable or other transmitting system must design a customized decoder having a particular hardware or software environment able to decode their signal. The signal typically comprises in part a data word of from between 16 to 24 bits which instructs the decoder that a scrambled signal is to follow, that it is to be decoded and includes information regarding the decoding scheme. Thereafter, upon receipt of a scrambled signal, the decoder will decode the signal, and display and emit proper video and audio signals so that a viewer may view and hear these signals descrambled. While this type of descrambling system has been sufficient, it has the following drawbacks.

First, each signal provider must design a particular decoder for its signal. Typically, a single manufacturer will design and produce such a decoder. Therefore, the signal provider is essentially locked into a single manufacturer for its decoding box. Essentially, the company producing this decoder would have the service provider at its mercy, and would therefore be able to charge very high rental fees to each individual consumer for the rental of its decoder. This could possibly price a particular service provider out of a market if other producers were to charge less for its rentals. Therefore, it would be beneficial to provide a signal decoder which was able to universally decode all signals, so that this one particular universal decoder could be used by all manufacturers of all cable systems with all encoded signals.

Additionally, cable decoders at this time are fully hardwired boxes, and are essentially non-upgradeable. The decoding software or hardware is included within the box. Therefore, the signal provider is limited to the use of a particular encoded signal in order to transmit its information. Any other encoding scheme will not be able to be decoded by the system. If technology were to improve, or additional signal encoding systems were to be invented which would provide a more secure system, a service provider would be required to recall each and every decoder, which would then be obsolete, and reissue new decoders to each of its users. This may be a very time-consuming and expensive process. It is also beneficial to provide an encoder capable of being customized on each individual service provided, and upgraded with a simple module or software upgrade that would upgrade decoders without hardware changes. Accordingly, it would be beneficial to provide an encoding/decoding system which would (1) be able to decode a number of encoded signals, and (2) have snap-in decoding modules. A customized encoding/decoding scheme eliminates the possibility of nationwide availability of pirate decoders.

Furthermore, pirating and stealing of decoded signals is a major problem confronting the cable industry. Each scrambled signal contains data which instructs a decoder now to decode a signal. It is easy to design a decoder which will illegally decode such a scrambled signal. Thus, it is beneficial to provide an encoded cable signal that does not include instructional data and a decoding system which could decode this signal without the need of this instructional data.

Finally, the marketplace is demanding audio and video equipment that enables the particular user to view movies and other television presentations at home and achieve a movie theater-like quality in the audio and visual presentation thereof. While a great number of products which produce such a result are known in the art, there has been virtually no improvement in the cable television transmission industry to provide such a theater-like atmosphere. These features, which are known in the art, include surround sound, sound retrieval systems (SRS) and three dimensional viewing. As noted, while each of these features is currently available, no equipment in the cable industry employs any of these inventions, and in fact, current cable equipment tends to inhibit rather than enhance the use of these products to produce a home theater environment.

Therefore, it would be beneficial to provide a cable decoding system which also provides the user the option of viewing a particular program with surround sound, sound retrieval and in three dimensional viewing.

SUMMARY OF THE INVENTION

Generally speaking, in accordance with the invention, a method for decoding and reconstructing a scrambled video signal is provided in which a scrambled video signal is received and the location of at least one predetermined element of the scrambled video signal is determined. Next, a horizontal sync is generated at the proper location of an output signal in response to the location of the at least one predetermined element of the scrambled video signal. Finally, the remainder of the scrambled video signal is output as an unscrambled video signal.

In a more preferred embodiment, a method for decoding and reconstructing a scrambled video signal is provided. This method comprises the steps of receiving a scrambled video signal, dividing the scrambled video signal into an inverted scrambled video signal and a non-inverted video signal and locating a horizontal sync of at least one of the inverted scrambled video signal and non-inverted video signal. Next, a horizontal sync signal is generated at the proper location of at least one predetermined element of an output signal in response to the location of the at least one predetermined element of the scrambled video signal. Next, it is determined whether the scrambled video signal is inverted. Then a color burst from the scrambled video signal is output as part of an unscrambled video signal for a predetermined time when the scrambled video signal is not inverted and a color burst from the inverted scrambled video signal is output as part of an unscrambled video signal for a predetermined time when the scrambled video signal is inverted. Additionally, active video from the scrambled video signal is output as part of an unscrambled video signal for a predetermined time when the scrambled video signal is not inverted and active video from the inverted scrambled video signal as part of an unscrambled video signal is output for a predetermined time when the scrambled video signal is inverted.

In an additional embodiment, the invention includes A method of encoding a video signal, which comprises the steps of receiving an unscrambled video signal and producing a scrambled video signal by altering at least one predetermined element of the unscrambled video signal without providing encoding data to aid in the decoding of the scrambled video signal.

The invention also includes an apparatus for decoding and reconstructing a scrambled video signal, which comprises a tuner for receiving and tuning a scrambled video signal and a transition tester coupled with the tuner for testing the scrambled video signal to determine the location of at least one predetermined element of the video signal. A video processor receiving an indication substantially corresponding to the determination of the at least one predetermined element from the transition tester is also provided. The video processor generates and outputs a horizontal sync in response to the indication from the transition tester. A selector coupled with the video processor outputs the remainder of the scrambled video signal as an unscrambled video signal.

In an additional embodiment, the invention also comprises an apparatus for decoding and reconstructing a scrambled audio video signal. The apparatus comprises a microprocessor and a tuner coupled with the microprocessor, the tuner tuning a particular portion of a scrambled incoming audio/video signal in accordance with instructions from the microprocessor. An audio module is coupled with the tuner for descrambling an audio portion of the scrambled audio/video signal received by the tuner, and an audio processor is coupled with the audio module for adding audio enhancements to a descrambled audio signal received from the audio module. Alternatively, or in addition, a video module is coupled with the tuner for descrambling a video portion of the scrambled audio/video signal received by the tuner, and a video processor is coupled with the video module for adding video enhancements to a descrambled video signal received from the video module.

Accordingly, it is an object of the invention to provide an improved apparatus and method for decoding and reconstructing a scrambled audio and/or video signal.

Another object of the invention is to provide an improved apparatus and method for decoding and reconstructing a scrambled audio and/or video signal which does not utilize any instructional data from the signal to decode the signal.

A further object of the invention is to provide an improved apparatus and method for decoding and reconstructing a scrambled audio and/or video signal which allows for the addition of various audio and/or video enhancements without the requirement of additional hardware.

Yet another object of the present invention is to provide an improved apparatus for decoding and reconstructing a scrambled audio and/or video signal which employs snap-in modules for increased upgradability.

Still another object of the present invention is to provide an improved apparatus for decoding and reconstructing a scrambled audio and/or video signal which is individually addressable.

Still other objects and advantages of the invention will in part be obvious and will in part be apparent from the specification and the drawings.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
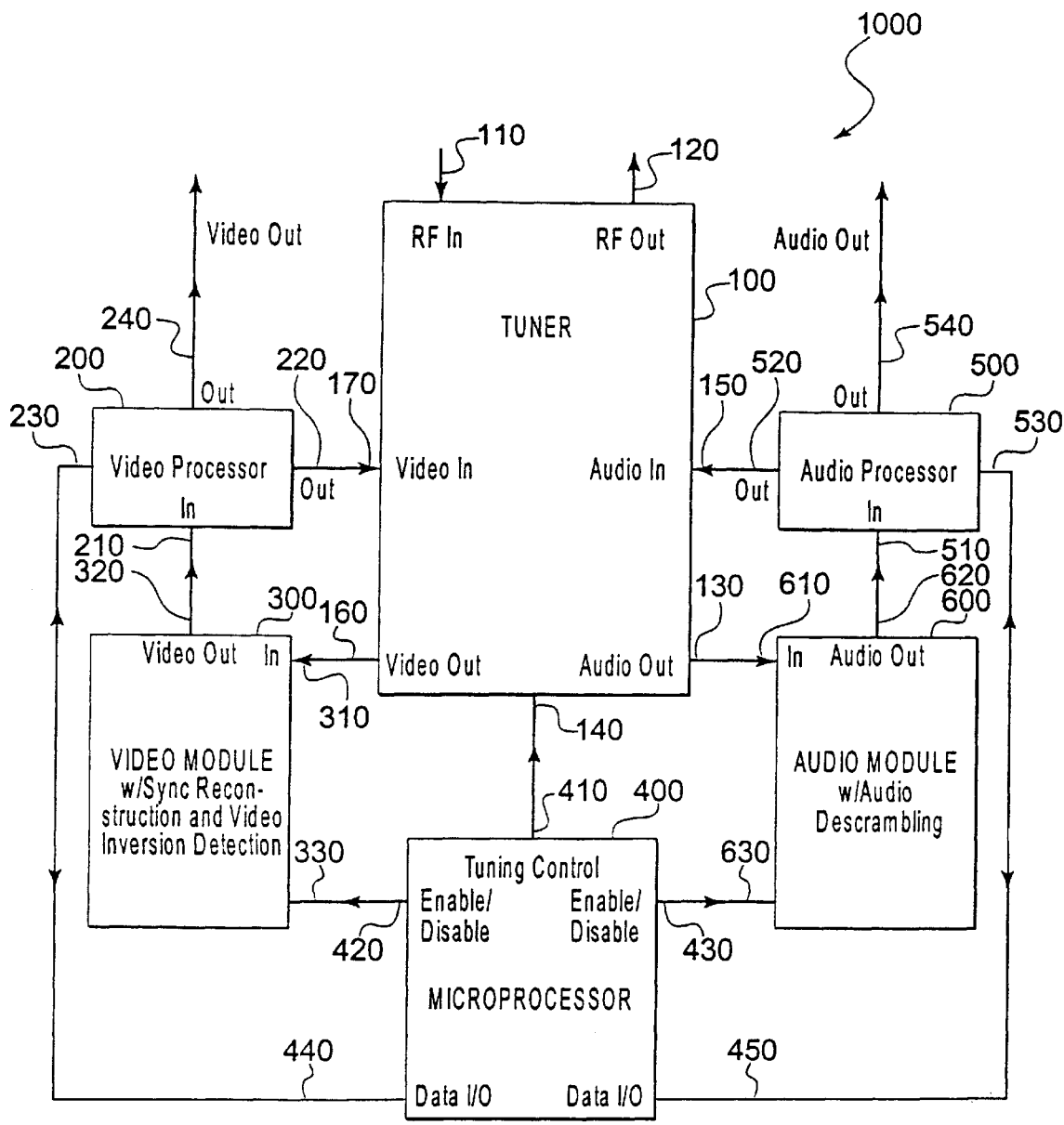
FIG. 1 is a schematic diagram depicting a television receiver and descrambler constructed in accordance with the invention.

Referring first to FIG. 1, a television signal receiver and descrambler is indicated generally as 1000. Television receiver and descrambler 1000 includes a tuner 100, a video processing unit 200, a video module 300, a microprocessor with tuning control 400, an audio processor 500 and an audio module 600. The operation of television receiver and descrambler 1000 is controlled by microprocessor 400.

Microprocessor 400 outputs a tuning control signal 410, which is received by tuner 100. Tuning control signal 410 tunes tuner 100 to a particular frequency. Tuner 100 receives an RF signal through an RF input pin 110. Upon receipt of this RF signal, tuning control signal 410 determines which portion of the signal from the RF input to tuner 100 is to be read. Upon this determination, the proper portion of the RF in signal is read, and the remainder of the signal is ignored. Tuner 100 further comprises an RF out pin 120, which acts an RF output after the signal is unscrambled. In this manner it is possible to send the unscrambled RF signal to an additional receiver, such as a VCR or the like.

After extraction of the proper portion of the RF signal, tuner 100 separates the video and audio portions of the remaining signal. This separation is also controlled by microprocessor 400 through tuning control signal 410 received at tuning control input pin 140 of tuner 100. The audio portion of the signal is outputted from tuner 100 through audio output pin 130 and is received by audio module 600 through an input pin 610. Audio module 600 descrambles the audio signal in a manner well known in the art. Specifically, the audio signal may only be scrambled in a predetermined number of ways, and any number of descrambling methods known in the art may be employed in this audio module in order to unscramble the audio portion of the RF signal. Upon completion of this audio descrambling, a descrambled audio signal is output from audio module 600 through an audio output pin 620. This descrambled audio signal is received by audio processor 500 through descrambled input pin 510. All control of audio module 600 is performed by microprocessor 400 through an output of an audio control signal 430, which is received by audio module 600 through an audio microprocessor control pin 630.

After receipt of this descrambled audio signal from audio module 600 by audio processor 500, this signal is fed back in a feed-back type loop through audio tuner output pin 520 to tuner 100 through an audio input pin 150. Further operation of audio processor 500 is controlled by a separate, included microprocessor (not shown) or alternatively by microprocessor 400, which outputs instructions as an audio processor control signal 450. These instructions are received by audio processor 500 through an audio microprocessor data pin 530. When properly instructed, audio processor 500 outputs a proper audio signal on an audio output pin 540. Additionally, tuner 100 remodulates the unscrambled audio signal received at audio input pin 150 with an unscrambled video signal (discussed below) and outputs an unscrambled RF signal.

Audio processor 500, rather than simply being a pass-through and containing additional instructions for outputting the descrambled audio signal, may also employ additional well-known audio enhancement techniques including surround sound stereo sound, sound retrieval systems (SRS) or the like. Additionally, other audio aspects, such as balance, treble, bass or the like may be controlled. Therefore, once a signal has been descrambled, the audio processor may, for example, extract the proper portions for surround sound, for stereo broadcast or for sound retrieval systems (SRS). Therefore, enhanced audio signal may be obtained without employing additional hardware.

Audio processor 500 implements these enhancements and provides an enhanced audio signal. This enhanced audio signal is output in the manner previously discussed through audio output pin 540 and is fed back to tuner 100 through audio tuner output pin 520 to be remodulated into an unscrambled RF output. The extraction of enhanced audio signal is controlled by either a separate, included microprocessor (not shown) or alternatively by microprocessor 400 through audio processor control signal 450 by instructions received by audio processor 500 through output microprocessor data signal 530. Thus, if a particular audio enhancement scheme requires a high level of microprocessor action, it is possible to provide a dedicated individual microprocessor within audio processor 500. This dedicated processor may obtain timing data and other general information from microprocessor 400, but would contain the individual audio extraction program and other specifics associated with implementation of individual audio enhancements within the dedicated microprocessor.

Returning to microprocessor 400 and tuner 100, upon extraction of a particular wavelength of the RF signal received on RF input pin 110, the video portion of the signal is also extracted by tuner 100. This video signal is scrambled by a method known in the art, as discussed above.

This scrambled video signal is output from tuner 100 through video output pin 160 and is received by video module 300 through a video input pin 310. The control and timing of video module 300 is controlled by an included video microprocessor 350 (FIG. 2) and is instructed as will be noted below. Alternatively, it is possible to control video module 300 by microprocessor 400 through instructions output as a video control signal 420 and received by video module 300 through a video microprocessor control pin 330.

Upon receipt of a scrambled video signal from tuner 100 through video input pin 310, video module 300 receives the scrambled video signal and reconstructs a proper unscrambled video signal, as will be discussed in greater detail below. After generation of such an unscrambled video signal, this unscrambled video signal is output from video module 300 through a video output pin 320 and is received by video processor 200 through an unscrambled video input pin 210. The functioning of video processor 200 is controlled through microprocessor 400 by instructions output as a video processor control signal 440 and received by a video microprocessor data pin 230. Upon receipt of the unscrambled video signal, video processor 200 is instructed to output, at the proper time, this unscrambled signal through a video tuner output pin 220. The signal is then received by tuner 100 in a feed-back loop type system through a video input pin 170. This unscrambled signal is modulated with the unscrambled audio signal received by tuner 100 on audio input pin 150, and is output as an unscrambled RF signal on RF output pin 120. Additionally, this unscrambled video signal is output through a video output pin 240, and is forwarded to a video display device, such as a television screen, video tape or the like.

Similar to the functioning of audio processor 500, video processor 200, may also act to employ additional video enhancement, rather than acting only as a timing and video pass-through module. Therefore, once a signal has been descrambled, the video processor may extract the proper portions for any desirable effect. Specifically, video processor 200 may be used to add a three dimensional aspect to the video signal, employing a method well known in the art. It is also be possible to employ any additional video enhancements and any user option functions including brightness control, color control or tint control. Therefore, to employ any video enhancements, it is not necessary to utilize additional hardware, and the use of these additional video enhancements will not be hindered by the signal descrambler. Rather, a particular cable box signal descrambler may be programmed to extract any number of video enhancements contained within an audio signal, or can implement additional video enhancements not contained in the video signal. This enhanced video signal is output in the manner previously discussed on video output pin 240 and is modulated by tuner 110 into the unscrambled RF signal output on RF output pin 120. The extraction of enhanced video signal is controlled by an included video microprocessor 350 (FIG. 2) or, alternatively, by microprocessor 400 through video microprocessor data signal 230. Thus, if a particular video enhancement requires a high level of microprocessor action, it is possible to provide a dedicated individual video microprocessor 350 within video processor 200 to obtain general information from microprocessor 400. At the same time, the dedicated processor may contain the individual video extraction or generation program, timing data generation and other specifics associated with implementation of individual video enhancements.

Microprocessor 400 controls the overall flow of data within the system. More specifically, microprocessor 400 coordinates the output from video processor 200 on video output pin 240 and audio output from audio processor 500 on audio output pin 540 and insures an unscrambled, modulated audio/video signal on RF output pin 120. In this manner, the video output and audio output are coordinated so that a complete audio/video signal is displayed to a user on a television or the like, or is directed to a recording apparatus. Thus, a scrambled audio/video signal may be inputted to the descrambling tuner in a known manner and may be properly output so that a user can view and hear an unscrambled signal.

Figure 2:
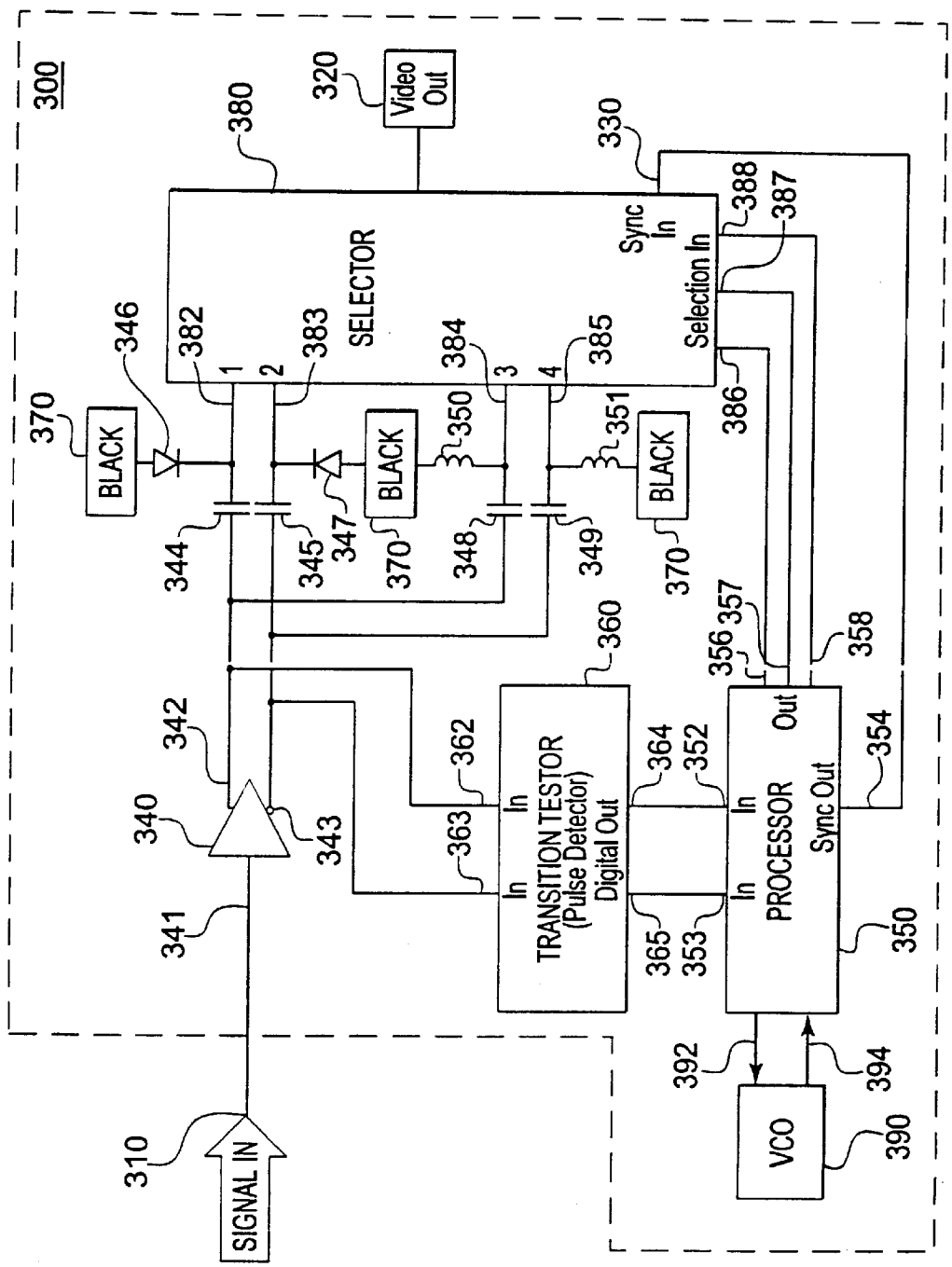
FIG. 2 is a schematic diagram depicting a video module of the television receiver and descrambler of FIG. 1.

As noted above, while the audio processing and descrambling may be performed in a manner well known in the art, reference is now made to FIG. 2 directed to the internal structure and further operation of video module 300. In general, video module 300 is provided with an amplifier 340, a video microprocessor 350, a transition tester module 360, a black level provider 370, a video selector 380, and an oscillator 390 coupled with video microprocessor 350. Amplifier 340 includes an amplifier input 341, an amplified output 342 and an inverted amplified output 343. Amplified output 342 is maintained in series with a capacitor 344, and inverted amplified output 343 is maintained in series with a capacitor 345. Capacitor 344 is in turn connected to an amplified input pin 382 of selector 380, and capacitor 345 is coupled with an inverted amplified input pin 383 of selector 380. A diode 346 is also coupled between capacitor 344 and amplified input pin 382. And in turn is coupled to black level 370. Similarly, a diode 347 is coupled between capacitor 345 and inverted amplified input pin 383, and in turn coupled to black level 370. The output from amplified output pin 342 is also coupled to a capacitor 348, while the output of inverted amplified output 343 is coupled to a capacitor 349. Capacitor 348 is coupled with second amplified input pin 384. A first end of inductor 350 is coupled between capacitor 348 and second amplified input pin 384, while the other end of inductor 350 is tied to black level 370. Capacitor 349 is coupled with a second inverted amplified input pin 385. A first end of inductor 351 is coupled between capacitor 349 and second inverted amplified input pin 385, while the other end of inductor 351 is coupled with black level 370.

The output from amplified output pin 342 is coupled with amplified transition pin 362 of transition tester 360. The inverted amplified output from inverted amplified output pin 343 is coupled with inverted amplified transition pin 363. After processing within transition tester 360, as will be described below, transition output 364 is fed to video microprocessor 350 through transition input pin 352, and inverted transition output 365 is fed to video microprocessor 350 through inverted transition output 353.

Oscillator 390 is coupled to video microprocessor 350. Power is provided to oscillator 390 through an oscillator power line 392 from video microprocessor 350. Additionally, a clock signal from oscillator 390 is provided to video microprocessor 350 through an oscillator clock signal line 394.

Video microprocessor 350 provides a clock signal at video control pin 354, and, which is in turn coupled to selector 380 at video microprocessor control pin 330. The control clock signal clocks in a three line binary control word, which is output from video microprocessor 350 on first, second and third output selector lines 356, 357 and 358, respectively. This binary word is in turn received by selector 380 through first, second and third input selector lines 386, 387 and 388, respectively. Finally, as noted above, selector 380 is provided with a video output 320, which, as is shown in FIG. 1, is directed towards unscrambled video input pin 210 of video processor 200.

The operation of video module 300, and its interaction with video microprocessor 350 will now be described with reference to the flowchart of FIG. 4, in addition to FIG. 2. Video module 300 receives the video portion of the RF signal from tuner 100 via video input pin 310 as is shown in Step 1. This input is in turn fed to amplifier 340 through amplifier input 341. The signal is then amplified and output as amplified output 342. Additionally, the signal is inverted and is output from amplifier 340 in an inverted state as inverted amplifier output 343 as is shown in Step 2. As noted above, one of the methods employed for scrambling a video signal is to invert the signal. At this point, the system has not determined whether the signal has been inverted or not. Therefore, a standard and inverted signal are output and fed through the system.

When it is determined whether the signal has been inverted or not, the proper signal may be used to generate the color and picture data. These signals are fed through capacitors 344 and 345 respectively, and are then entered into selector 380 through amplified input pin 382 and inverted amplified input pin 383. These standard and inverted signals are also fed through capacitors 348 and 349, and are fed to selector 380 through second amplified input pin 384 and second inverted amplified input pin 385 as shown in Step 3. The input into pins 382 and 383 are fed through diodes 346 and 347, which are in turn connected to black. The signal fed to pins 384 and 385 are additionally fed through conductors 350 and 351, the other ends of which are tied to black. Therefore, four different channels are input into selector 380, two of them being inverted, and two of them being standard video signals. Two channels of each signal are provided, and are coupled with black level 370 in different manners so that different portions of the signal may be extracted simultaneously, and different reference points may be available for use by the system.

In addition to being sent to selector 380, amplified output 342 and inverted amplified output pin 343 are fed to transition tester 360 through amplified transition pin 362 and inverted amplified transition 363 respectively as shown in Step 4. Transition tester 360 scans the input signal and attempts to find a horizontal sync as shown in Step 5. As noted above, a second method by which signals are scrambled is to raise or lower the voltage level of the horizontal sync. Therefore, if a standard decoder box is looking for a horizontal sync at a particular voltage value, there would be no horizontal sync due to the change in voltage level. As a result, the decoder is unable to determine when to start and end a particular line of video and line up the video with the color, rendering the picture unviewable. To overcome this problem, transition tester 360 searches for a horizontal sync of a predetermined length, which is common to every video signal, regardless of the voltage level. Alternatively, transition tester can be programmed to search for any other common attribute of the horizontal sync, or any other portion of the video signal. Once this horizontal sync has been located, it serves as a reference point for video module 300, and allows video microprocessor 350 to reconstruct a new video signal, incorporating color and video information from the original scrambled video signal.

After the horizontal sync of the incoming scrambled signal has been located and pinpointed, in each of the regular and inverted signals, the timing data and pulses are outputted on transition output pin 364 and inverted transition output pin 365 respectively. These outputs are received by video microprocessor 350 on transition input pin 352 and inverted transition input pin 353. As noted above, upon receipt of these inputs, video microprocessor 350 is able to generate a complete new video signal, utilizing the horizontal sync timing, oscillator 390, and the information being input to selector 380 from invertor 340.

Figure 3:
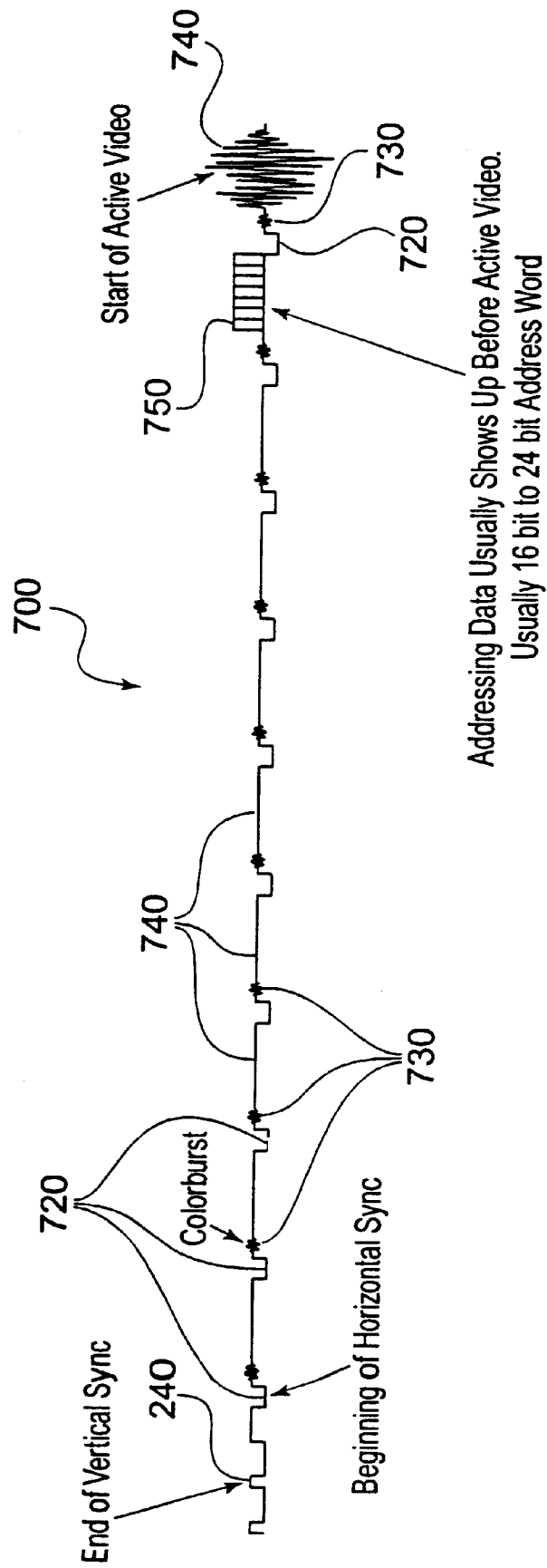
FIG. 3 is a schematic diagram depicting the wave form of a video signal.

As is shown in FIG. 3, a video signal, indicated generally as 700, includes a vertical sync 710, a plurality of horizontal syncs 720, a plurality of color bursts 730, each being associated with a particular horizontal sync 720, and a plurality of active video portions 740, each being associated with a particular pair of color bursts and horizontal syncs.

Video signal 700 is also provided with addressing data 750 which informs a particular decoding box of the method of encoding, and carries various additional data so that a particular decoding box may properly display a signal.

In operation, the following steps occur: (1) vertical sync 710 informs the raster of a television screen to move from the end of a screen, which is the bottom right portion, to the beginning of the next screen, which is the top left corner thereof; (2) a horizontal sync 720 is then issued, which sets up the timing for a line of color and video; (3) a color burst 730 is next issued, which includes instructions for the color to be employed on an entire line of the picture; and (4) an active video portion 740 is thereafter superimposed over the color burst, thereby providing a specific video pattern, and colors in combination for a particular line of television. As is shown in FIG. 3, prior to addressing data 750, the active video shows only a blank screen. Thereafter, active video 740 is a complicated data signal comprising an entire line of video. The typical television in the United States will employ 525 lines with 525 horizontal syncs. These syncs may write 525 lines consecutively, or may write every other line on a first pass, and then write the other lines on a second pass. However, this invention is in no way limited to systems employing 525 lines of video, but may be used for video employing any number of lines.

Addressing data 750 follows after a predetermined number of color bursts and blank black active videos. However, in the current invention, addressing data 750 may be discarded, since the current invention does not utilize the encoding sequence of the provided signal, but is rather reconstructing an entire signal, regardless of the encoding method utilized. In an alternative embodiment, it is possible to use small portions of the addressing data in order to determine individual features. However, the majority of such data will not be utilized.

Figure 4:
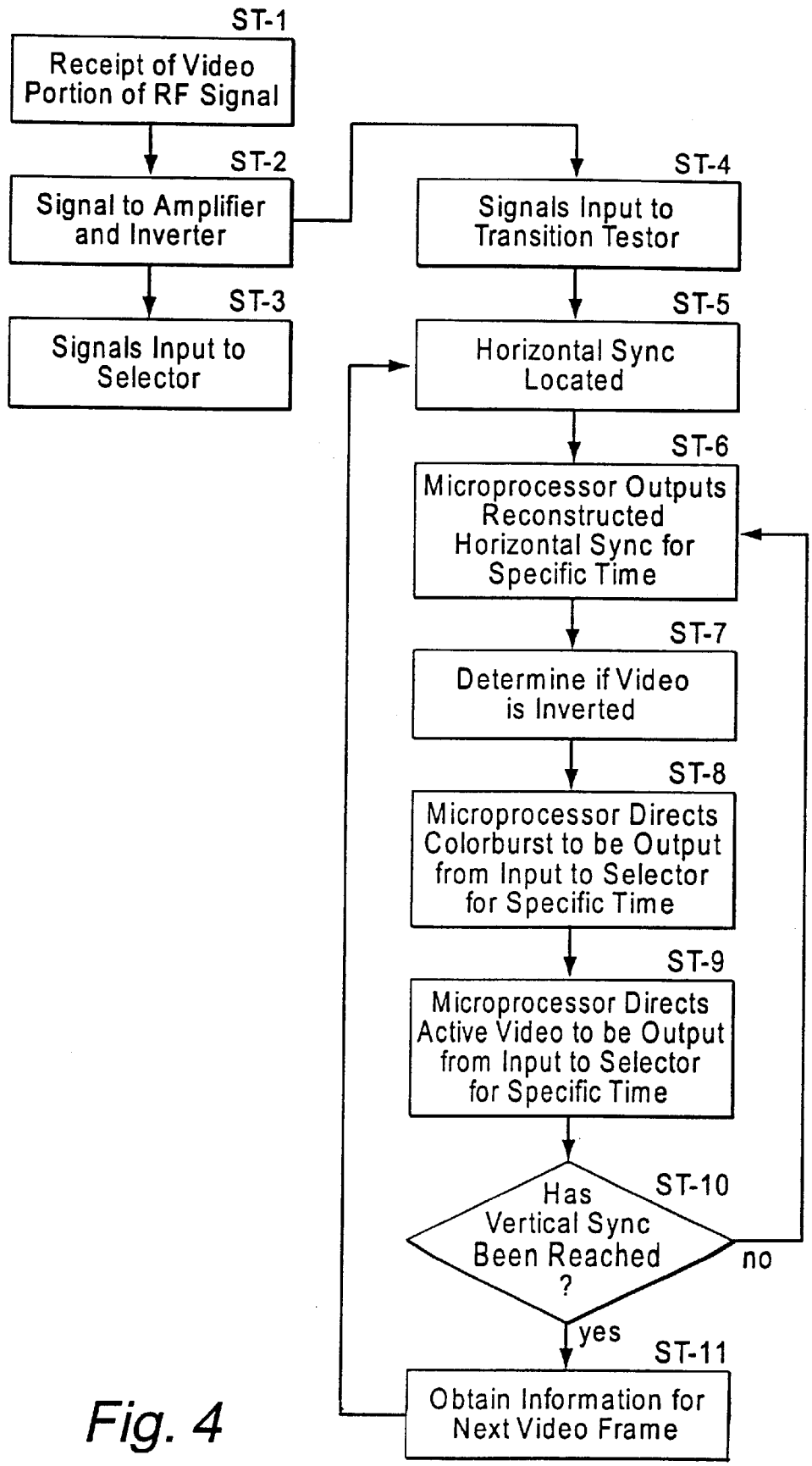
FIG. 4 is a flow diagram depicting the operation of the video module of FIG. 2.

Referring to FIGS. 2, 3 and 4, after the timing of the horizontal sync is input into video microprocessor 350, video microprocessor 350 is aware of when the television signal horizontal sync must be placed. Additionally, as noted above the standard and inverted video signals are simultaneously being directed towards selector 380 through pins 382, 383, 384 and 385. Therefore, at this time, it is possible to begin reconstruction of an entirely new video signal, which will output an unscrambled version of the signal input to the system.

In order to produce such a signal, it is necessary that the timing of each of the horizontal syncs, color bursts, and active video be managed precisely. For this purpose, oscillator 390 is provided. Oscillator 390 is provided with power from video microprocessor 350 through oscillator power line 392, and outputs an oscillator clock signal 394 from oscillator 390 to video microprocessor 350. In a preferred embodiment, the oscillator outputs a clock signal at approximately 20.014 MHZ. This clock frequency is arrived at as follows: The video carrier operates at a frequency of 15734.26374 HZ. Additionally 318 instructions are required to reconstruct the entire video sync. The processor utilized in this embodiment divides its clock cycle into four parts. Therefore, in order to provide a clock signal which is capable of supporting each of these parts. The speed must be 318*15734.26379*4=20,013983=20.014 MHZ. In an alternative embodiment, any number of additional clock signals may be utilized if they provide the proper clock signal speeds. However, this clock signal is most preferred, since it provides a proper multiple of all the necessary time intervals. Since the signal is to be reconstructed, any timing discrepancy with the incoming data to selector 380 will result in an offset between the required timing data, and the actual signal rendering an improper outputted signal. Therefore, the accuracy of the this oscillator is of most importance.

Video microprocessor 350 is then programmed to begin the signal in connection with the horizontal sync which is detected by transition tester 360. Video microprocessor 350 outputs a horizontal sync at the proper voltage level for the corresponding amount of time through video control pin 354, which is received by selector 380 at video microprocessor control pin 330 as is shown in Step 6. Since this horizontal sync is a necessary first output for the video signal, this horizontal sync is fed through selector 380 and output on video output pin 320 to form the first portion of the output video signal. After a predetermined number of oscillations have been clocked, the horizontal sync generated by video microprocessor 350 is turned off.

At this time, video microprocessor 350 is programmed to insert a color burst for a predetermined number of oscillations. Color burst 730, as shown in FIG. 3, must follow the rising edge of horizontal sync 720. Therefore, on first, second and third output selector lines 356, 357 and 358, respectively, video microprocessor 350 outputs a particular binary word, which is input to first, second and third input selector lines 386, 386 and 388, respectively. This binary word allows the selection, in this preferred embodiment, between input pins 382, 383, 384 and 385 to selector 380. In a preferred embodiment, positive video is available on input pin 382, inverted video is available at pin 383, positive color burst is available at input pin 384, and negative color burst is available at pin 385. Each of the inputs are band pass filtered so that the proper portion of the video signal is available. Therefore, in this preferred embodiment, a color burst is the next required output. However, it is first necessary for video microprocessor 350 to determine whether the signal has been inverted or not. Video microprocessor 350 employs a program to determine whether the signal has been inverted or not from the input received from transition tester 360. Alternatively, it is possible for selector 380 to read a portion of the addressing data, which is further down the line, and to determine whether the signal has been inverted.

In either manner, once it has been determined whether the video has been inverted or not, the process of building the new unscrambled video signal may continue. By way of example only, it will be assumed that the signal has not been inverted, and therefore pins 382 and 384 will be utilized. However, it is to be understood that if the signal were inverted, in this preferred embodiment, pins 383 and 385 would be utilized. Therefore, since a color burst is next required, and as noted above, in a preferred embodiment, the color burst is extracted out at pin 384, video microprocessor 350 sends the proper signal to select pin 384, and passes this color burst information through selector 380 to follow the horizontal sync on video outline 320 as is shown in Step 8. This color burst is passed through to video output line 320 for a predetermined number of oscillations as is determined by video microprocessor 350 in connection with oscillator 460. After the predetermined number of oscillation pulses have passed, the output from pin 384 is cut off from video outline 320.

Next, as is shown in FIG. 3, it is necessary to follow color burst 730 with an active video portion 740. Active video portion 740, in this embodiment, is positive active video, and will be contained on pin 382. Therefore, video microprocessor 350 outputs the proper binary word to select pin 382 of the selector on lines 356, 357 and 358, respectively and the active video is output on video output pin 320 as shown in Step 9. Thus, since the active video plays for a predetermined number of oscillations, these oscillations are controlled by video microprocessor 350 in connection with oscillator 390, and the input at pin 382 is directed towards video output line 320 for this predetermined amount of time. After sufficient time has passed, input pin 382 is decoupled from video output line 320, and the active video is completed. As is noted above, this active video may comprise only black, in which a black line will be generated, or may comprise any amount of active video data.

After the active video has been transmitted, as is shown in FIGS. 3 and 4, if the vertical sync indicating the end of the screen has not been reached (Step 10), then it is necessary to generate an additional horizontal sync, since all the color and video for a particular line have already been output, and it is necessary to move the raster to the next line. Therefore, video microprocessor 350, as stated above, generates a horizontal sync for a particular length based on oscillator 390 and output this horizontal sync on video control pin 354, which is input to selector 380 via video microprocessor control pin 330. The horizontal sync is then output on video output line 320 from selector 380. Thereafter, the sequence of selecting the color burst and the active video will take place, and a second line of video will be output on video output line 320.

After the proper number of lines of video is output, a vertical sync is issued by video microprocessor 350 at the proper time, as is determined by video microprocessor 350 and oscillator 390. The raster returns from the bottom right of the 525th line of the screen to the top left of the first line of the screen as is shown in Step 10. Thus, the raster and video generator will be ready to generate an additional screen of video as shown in Step 11.

While in FIG. 3 addressing data is shown, this addressing data is only contained on a transmitted signal to video decoder box. The addressing data is not output from the decoder box to the video display apparatus. Therefore, in a conventional decoder, this addressing data would be read from the signal, utilized to decode the signal, and would be eliminated from the signal. Since in the present invention, it is not necessary for this data to be utilized to decode a signal, this data need not be in the scrambled signal in the present invention. Alternatively, it is possible to utilize a small portion of the video data to determine, for example, if the signal is inverted. However, even if a portion of this data is used, it is not part of the output unscrambled signal, but only part of the input, scrambled signal.

Therefore, by utilization of this apparatus, it is possible for a scrambled video signal to be input to a decoding receiver for unscrambling and for a proper unscrambled signal to be generated without utilization, or with utilization of only a small portion, of the addressing data. As a result, the decoder will decode any encoded information, regardless of the manufacturer or type of encoding utilized. Thus, a universal decoder can be provided that may be used with all encoding systems. A signal provider may then provide such decoders to its customers, and would be able to modify encoding methods, without changing the hardware. Additionally, a provider is not tied to a particular hardware supplier in order to decode its information.

Additionally, it is possible to use the decoding scheme of the present invention in order to provide an encoding scheme which is different from any presently used in the marketplace, and cannot be read by any other video decoders. Specifically, it is possible to provide an encoded signal which does not include any addressing data, or at most includes a very small amount of addressing data, which is insufficient for any other type of decoder to decode the signal. Specifically, since the signal may be encoded without addressing data, there are no instructions for decoding the signal. Therefore, only a decoder such as that set forth in the present invention is able to decode such a signal. Specifically, the encoded signal could, for example, provide a signal with a horizontal sync, color burst, and active video, without any addressing data contained thereon. Without this addressing data, the decoder of the present invention may reconstruct a signal which could be properly output to a video display device, but is impossible for any decoder which relied on this addressing data to do so. Therefore, this encoded signal may not be read by any other decoding devices. Additionally, it is possible to change the decoding sequence without modifying the hardware of the present invention. Since the present invention reconstructs the signal, rather than actually decoding the present signal, any encoding sequence may be decoded by the decoder.

Figure 5:
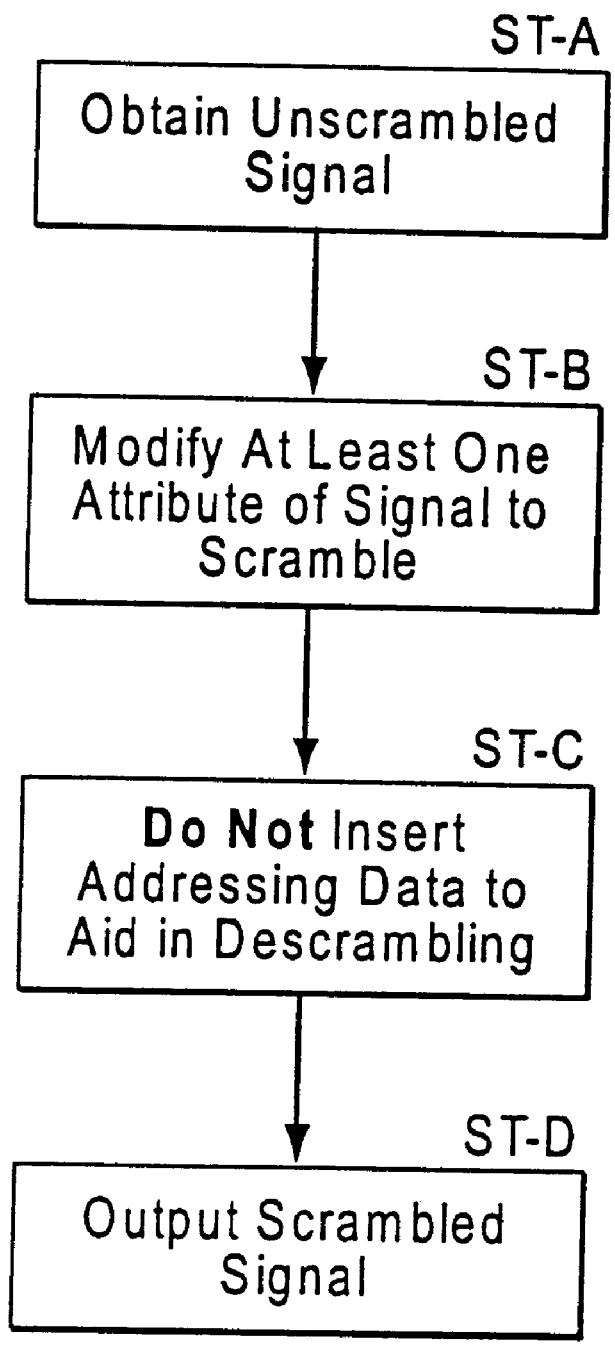
FIG. 5 is a flow diagram depicting the operation of an encoding feature in accordance with the invention.

Additionally, it would be possible to modify any portion of the signal, including the horizontal sync, vertical sync, or any other part of the signal by adding a gain thereto, or modifying the timing of this portion of the signal. Since no instructions for decoding would be included, only a decoder of the present invention would be able to decode the signal. Therefore, to encode a signal utilizing the present invention, one would first obtain an unscrambled signal, as is shown in Step A of FIG. 5. Next, any one of a number of attributes would be modified in the signal, as is shown in Step B. Step C precludes the writing of any addressing data to aid in the descrambling of the scrambled signal. Finally, in step D, the scrambled signal is output. Thus, a large number of encoding schemes are possible since any number of attributes of the signal can be altered, and since these schemes could be changed without modifying the decoder hardware, it would be very difficult for a pirate decoder producer to decode the changing signals.

Additionally, each decoder may be individually addressable via a transmitted signal, therefore making it possible to program the decoder without physically gaining possession of the decoder. As a result, the activation or deactivation of any particular channel may be easily made so that the user's decoder only decodes the particular channels and services that he or she has paid a transmission service fee for. For example, in a cable system, it might be possible to decode a particular movie channel, but not a second movie channel which has not been paid for by the user.

Finally, the decoder may be designed with snap-in modules, to provide alternative decoding sequences, or the availability of the additional features, which are noted above, which can be employed in the video processor or audio processor, such as three dimensional viewing, surround sound or the like. By being formed in a modular-type system, it is possible to physically add or remove additional functional features of the invention in order to improve the system as technology improves, without requiring the use of an entirety new system.

While this invention utilizes horizontal syncs in order to generate the proper timing for reconstruction of video signal, it is possible to search for any other portion of the video signal, and reference all timing data to that signal. For instance, it may be possible to utilize the beginning generation of a color burst, the beginning generation of the active video, or either the falling or raising edge of the horizontal sync, as well as any additional data which might be present in the signal. As long as the transition tester determines the precise location of a particular wave transition in a signal, the timing of the microprocessor can be coordinated with the incoming video signals.

It will thus be seen that the objects set forth above, among those made apparent for the preceding description, are efficiently attained and, since certain changes may be made in carrying out the above method, and in the construction set forth without departing from the spirit and scope of the invention, it is intended that all matter contained in the above description and showing the accompanying drawings shall be interpreted as illustrative and not in the eliminating sense.

It is also understood that the following claims are intended to cover all of the generic and specific features of the invention herein described, and all statements of the scope of the invention which, as a matter of language, might be said to fall therebetween.

What is claimed:

1. An apparatus for decoding and reconstructing a scrambled audio video signal, comprising:

a processor;

a tuner coupled with said processor, said tuner tuning a particular portion of a scrambled incoming audio/video signal in accordance with instructions from said microprocessor;

a video module coupled with said tuner for descrambling a video portion of said scrambled audio/video signal received by said tuner; said video module including a video processor for adding video enhancements selected from the group of adding a three dimensional aspect, brightness control, color control and tint control to a descrambled video signal received from said video module.

2. The apparatus of claim 1, wherein each element may be provided in a removable snap-in module.

3. The apparatus of claim 1, wherein said apparatus is individually, remotely addressable.

* * * * *